(No Model.)
W. W. LEE.
HANDLE FOR TABLE CUTLERY.
No. 401,181. Patented Apr. 9, 1889.
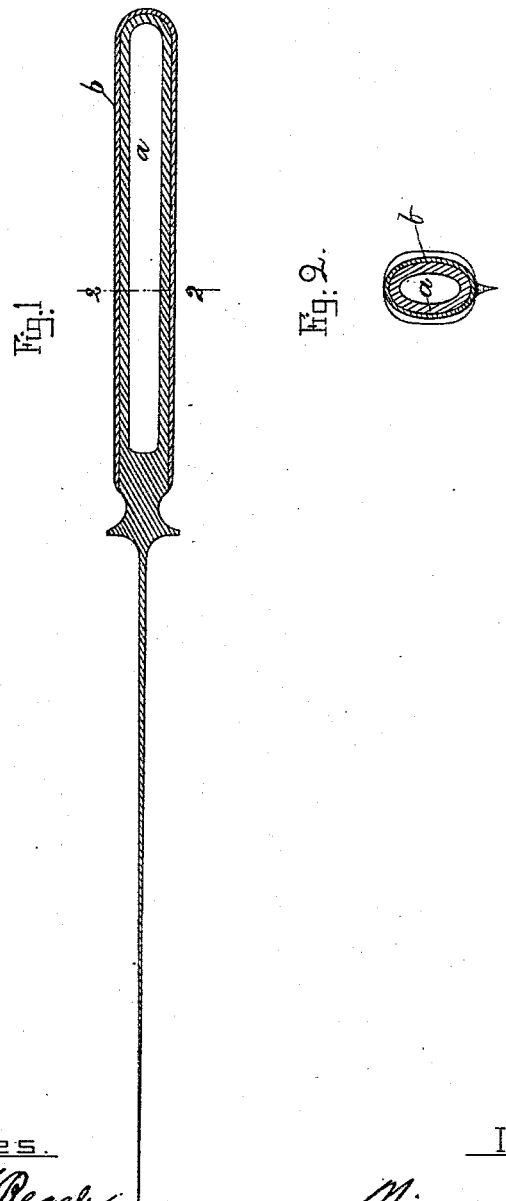
Witnesses
Edward S. Peach
Lauritz W. Molser
Inventor
William W. Lee
by
J. R. Maynadier

UNITED STATES PATENT OFFICE.

WILLIAM WILSON LEE, OF NORTHAMPTON, MASSACHUSETTS.

HANDLE FOR TABLE-CUTLERY.

SPECIFICATION forming part of Letters Patent No. 401,181, dated April 9, 1889.

Application filed September 7, 1888. Serial No. 284,834. (No model.)

*To all whom it may concern:*

Be it known that I, WILLIAM WILSON LEE, of Northampton, in the county of Hampshire and State of Massachusetts, have invented a new and useful Improvement in Hollow Handles, of which the following is a specification, reference being had to the accompanying drawings, in which—

Figure 1 is a central lengthwise section of a table-knife provided with a handle embodying my invention, and Fig. 2 is a transverse section of the said handle.

My invention is a compound handle consisting of a metal shell, which is of substantially the same form as the finished handle, and a shell of plastic material which covers and is sustained by the metal shell, the object of my invention being to produce hollow handles which have the appearance of rubber, ivory, or the like with a saving of plastic material and without undue weight.

Hitherto, as is well known to all skilled in the art, knives and forks have been commonly made with handles of rubber or the like attached to tangs fast to the knife or fork, and this method of construction has necessitated the use of an undue amount of rubber or else an undue weight by reason of too large a tang.

In the drawings, *a* is the hollow metal shell, and *b* the shell of plastic material, the tang being fast to the blade, entering and filling the blade end of the metal shell, and the metal shell and blade being united in ways too well known to all skilled in the art to require description.

In practice the shell *a* is wrapped with plastic compound, which is molded in place in a manner which will be plain without description to all skilled in the art.

The main advantages of my invention are the production of a handle which is in all respects as desirable as any rubber handle before known, and in many respects greatly preferable, and which is cheaper than those heretofore made.

I am aware of patents to Wingfield, No. 294,558, of March 4, 1884, and of Beals and Thomas, No. 222,229, of December 2, 1879, and disclaim all that is shown in them, for they describe a handle of plastic material held to a tang which is fast to a blade. I am also aware that it is not new to use a shell of metal secured to a tang fast to a blade, for that is shown in the patent to Brown and Osgood, No. 209,649, of 1878, and I disclaim all that is shown in that patent, my invention differing radically from anything shown in any of those patents, for the reason that I secure a thin shell of plastic material to a tang fast to a blade by means of a metal shell, which serves not only to secure the shell of plastic material to the tang of the blade, but also to support that shell and make it fit for use as one part of a compound handle.

What I claim as my invention is—

The compound handle above described, made up of the shells *a* and *b*, the inner shell, *a*, being of metal and connected to the tang of the instrument, and the outer shell, *b*, being of plastic material and molded upon the inner shell, *a*, all as and for the purpose specified.

WILLIAM WILSON LEE.

Witnesses:
S. P. PECK,
W. M. COCHRAN.